United States Patent [19]
Bhakuni et al.

[11] 3,714,772
[45] Feb. 6, 1973

[54] POLYAMIDE IN COMBINATION WITH POLYCARBONATE, METAL COMPLEX, POLYISOCYANATING AGENT FOR POLYESTER MODIFICATION AND RUBBER TIRE STRUCTURES MADE THEREFROM

[75] Inventors: Roop S. Bhakuni, Copley; Joseph L. Cormany, Jr., Akron, both of Ohio

[73] Assignee: Goodyear Tire & Rubber Company, Akron, Ohio

[22] Filed: March 22, 1971

[21] Appl. No.: 126,964

[52] U.S. Cl.............57/153, 57/140 C, 57/149, 156/110 C, 161/183, 161/190, 161/241, 161/248, 161/255, 161/257, 161/226, 161/231, 260/45.75 C, 260/3, 260/860, 260/863
[51] Int. Cl.....B32b 25/08, B32b 27/02, B32b 27/36
[58] Field of Search..........260/860, 45.75 C, 3, 863; 161/190, 183, 248, 255, 257, 226, 231, 241; 57/140 C, 153, 149

[56] References Cited

UNITED STATES PATENTS

| | | | |
|---|---|---|---|
| 3,410,749 | 11/1968 | Chmiel | 161/92 |
| 3,446,766 | 5/1969 | Taylor | 260/45.75 C |
| 3,359,235 | 12/1967 | Brignac et al. | 260/45.75 C |
| 3,426,100 | 2/1969 | McDonough | 260/860 |
| 3,563,849 | 2/1971 | Rye et al. | 260/860 |
| 3,414,537 | 12/1968 | Dikotter et al. | 260/45.75 C |
| 3,558,553 | 1/1971 | Hayes | 260/45.75 C |

*Primary Examiner*—Robert F. Burnett
*Assistant Examiner*—C. B. Cosby
*Attorney*—F. W. Brunner and V. G. Parker

[57] ABSTRACT

Relates to an improved rubber structure reinforced with an improved polyethylene terephthalate reinforcing fiber modified with a polyamide in combination with a metal complex or this two-component combination in combination with a polycarbonate, or the polyamide in combination with a polycarbonate and a polyisocyanating agent, the modifier being present with the polyester prior to fiber formation.

8 Claims, No Drawings

POLYAMIDE IN COMBINATION WITH POLYCARBONATE, METAL COMPLEX, POLYISOCYANATING AGENT FOR POLYESTER MODIFICATION AND RUBBER TIRE STRUCTURES MADE THEREFROM

This invention relates to an improved rubber structure reinforced with an improved polyester reinforcing fiber being modified with (1) a polyamide in combination with a metal complex compound or (2) the combination of (1) in combination with a polycarbonate or (3) a polyamide in combination with a polycarbonate and a polyisocyanating agent.

Pneumatic tires are being subjected to increasingly severe operating conditions including high speeds and heavy loads. Rubber used in the tire is reinforced with such materials as rayon, nylon, polyester, wire, and glass fibers. Maximum reinforcement of the rubber is obtained with a given fiber when maximum adhesion is produced between the rubber and fiber. Polyethylene terephthalate tire cords are particularly desirable to use as reinforcing elements because of their excellent dimensional stability as shown by low growth or stretch during service. However, it has been observed that in the environment of the rubber of a pneumatic tire the heat generated under high speeds and heavy loads causes the polyester cord to lose its durability, its tensile strength and ultimately its adhesion to the rubber.

The chemical environment of the rubber of a tire is complex because many different chemicals are needed in the construction of the tire in order to obtain maximum tire performance. Because of this chemical complexity in the rubber of the tire and the severe heat developed during service, a variety of chemical reactions take place resulting in the degradation of the polyester cord.

Many attempts have been made to minimize these destructive forces and the present invention is an advance in solving the problems created by these destructive forces. Prior attempts have been made by modifying the rubber. Other attempts have been directed toward the adhesive. The present invention is directed toward modifying the polyester cord.

It has now been discovered that a more thermally stable pneumatic tire may be made when the rubber thereof is reinforced with a polyester cord modified in the manner described herein.

The thermally stable tire is made possible by the discovery that a polyester cord used in the construction of the pneumatic tire can be protected against tensile loss in the cord and degradation of the adhesive bond between the cord and the rubber by incorporating in the polyester prior to fiber formation a critically small amount of a combination of modifiers. Combination modifiers useful in this invention are any of the following:

1. A polyamide in combination with a metal complex.
2. A polyamide in combination with a metal complex plus a polycarbonate.
3. A polyamide in combination with a polycarbonate plus a polyisocyanating agent.

It is believed that certain desirable reactions take place between certain undesirable by-products present in the polyester and the added modifiers to form a reaction product which is less detrimental to the polyester at elevated temperatures than are the by-products.

The polyamides useful in this invention are any of the well-known condensation products of an organic diamine with a dibasic acid and more fully described in U.S. Pat. Nos. 2,071,250 and 2,071,253. More specifically, the preferred polyamide for use in this invention is the linear condensation superpolymer known as nylon 66 and made from hexamethylenediamine and adipic acid. The nylon 66 used in the example below, where indicated, was "Zytel 101" a trademark of the specific nylon 66 sold by DuPont. It is desirable that the linear polyamide have a melting point at least as high as 175° C. or 200° C. and preferably higher, for example, 225° to 275° C. More specifically, polyamides which may be used include those derived from dicarboxylic acids, for example, succinic acid, glutaric acid, adipic acid, pimelic acid, suberic acid, azelaic acid, and sebacic acid; and from diamines containing, for example, two to 10 carbon atoms such as ethylene diamine, tetramethylene diamine, hexamethylenediamine, octamethylene diamine, 1,4-di(methylamino) cyclohexane, etc; or the nylon may be derived from an omega-amino carboxylic acid such as omega-aminobutyric acid, omega-aminopimelic acid, omega-aminocaproic acid, etc., or the lactams thereof. Thus the modifier may be those nylons referred to by number as 4, 5, 6, 7, 8, and 11. The polyamide may be preferred from a lactam containing from four to 11 carbon atoms. The polyamides desirably have molecular weights in the range of 16,000 to 30,000.

The polyamides, when used in combination with the other modifiers of this invention, may be used in an amount from about 0.01 part to about 5.0 parts by weight per 100 parts of polyester.

The metal complex compound that may be used in combination with the polyamide is any complex the metal ion of which has an incompletely satisfied '$d$' orbital and will further complex or coordinate with compounds containing atoms like N, O, P, S and halogens and has a stability (log k) constant for its ammonia and amine complexes of between 5 and 25. The metal ions preferred in the metal complex of this invention include Ti, V, Cr, Mn, Fe, Co, Ni, Cu, Zr, Nb, Mo, Tc, Ru, Rh, Pd, Ag, Hf, Ta, W, Re, Os, Tr, Pt, Au, Th, and Pa. A preferred metal complex is copper dimethyldithiocarbamate having the general formula

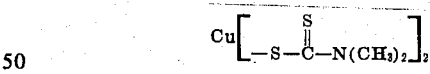

The metal complex when used in combination with the polyamide and other modifying agents may be used in amounts from about 0.0001 part to 0.1 part by weight per 100 parts of polyester. It is essential that when the metal complex and the other modifiers are to be intimately blended with the polyester in the molten state which occurs in the range from about 270° C. to about 310° C. that the molten blend be maintained under a pressure of about 800 pounds per square inch for not more than 10 minutes and preferably for from 1 to 4 minutes and out of contact with oxygen, a condition present in melt spinning apparatus.

It is preferred to add the metal complex as a powder to the polyester chips just prior to the introduction of the mixture into the extruder associated with the spinning of the resulting molten mixture into filaments.

The polyester modifier may be physically blended as a master batch as solids in a double cone dryer and then feeding the blend or separate materials in an exact ratio at the throat of the extruder.

The polycarbonate, when added with the metal complex, may be present in an amount of between about 0.5 part to 2.5 parts by weight per 100 parts of polyester.

Any polycarbonate may be used as an additive or modifier or scavenger or protective agent in combination with the polyamide and the other modifiers or scavengers or protective agents for polyester tire cord. Broadly, the polycarbonates may be any derived from 4,4'-dihydroxy-di(mononuclear aryl)-alkane and having a molecular weight between about 15,000 and about 80,000 and an intrinsic viscosity between about 0.46 and about 1.2 as measured by dilute solution viscometry in methylene chloride at 25° C. These polycarbonates can be prepared in accordance with conventional methods including phosgenation in which phosgene is blown into the 4,4'-dihydroxy-di(mononuclear aryl)-alkane in the presence of an aqueous solution of a caustic alkali and a solvent. The ester-interchange method may also be used wherein a 4,4'-dihydroxy-di(mononuclear aryl)-alkane is reacted with a diester of carboxylic acid and as more fully described in British Pat. No. 772,627.

The polycarbonate used in the example below where indicated was a polyester of carbonic acid and bisphenol A known as [bis-(4-hydroxy phenyl)2,2,propane] and having the repeating unit structure

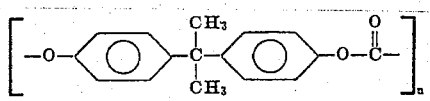

wherein $n$ is a measure of the molecular weight and may be at least 10 and up to 400, also known as "Merlon" resins sold by Mobay Chemical Company, and more specifically known as "Merlon M-39" wherein $n$ in the formula has a value of 39.

The polyisocyanate and polyisocyanate generating agents, for example polyurethanes, which may be used as a modifier in combination with the polyamide and polycarbonate may be present in an amount from about 0.01 part to 2.0 parts and preferably from about 0.05 part to about 1.0 part per 100 parts by weight of polyester.

Any polyisocyanate or polyisocyanate generating compound collectively referred to as polyisocyanating agent can be added to the polyester chips prior to fiber formation. Typical polyisocyanating agents that may be used are those disclosed in U.S. Pat. No. 3,563,849, particularly isocyanate generating compounds known as blocked isocyanates (also referred to as polyurethanes) which include all reaction products of an isocyanate and a compound having a hydrogen reactive with the isocyanate group. Examples of the blocking compounds include monohydroxy compounds, especially primary and secondary alcohols, details of preparation being disclosed in U.S. Pat. No. 2,952,665 and 3,325,333, amines including urea, primary and secondary mono and polyhydric phenols including phenol and resorcinol, amides as well as lactams, details of preparation being disclosed in Belgian Pat. No. 665,474, and resinous compositions which have an active hydrogen and will block an isocyanate. The preferred type of resinous blocking agent is made by reacting an aldehyde with a resin-forming component such as urea, or a phenol, preferably a polyhydric phenol, such as resorcinol. Suitable aldehydes that may be used in forming a resin include formaldehyde, acrolein, glyoxal, furfural, crotonaldehyde, aldol and benzylaldehyde. Suitable phenols that may be reacted with one of the aforementioned aldehydes, include phenol, cresol, catechol, phloroglucinol, saligenin, dibeta naphthol, xylenol, hydroquinone, resorcinol, orcinol, pyrogallol, beta-naphthol, aminophenol, guaiacol, as well as urea and melamine. More detail of preparation is disclosed in U.S. Pat. No. 3,268,467. The preferred polyisocyanating agent used in the examples below where indicated is a polyester blocked polyisocyanate known by the trademark "Texin" 192A sold by Mobay Chemical Company and prepared by reacting 100 parts of the hydroxy polyester prepared from reacting 11 mols of ethylene glycol with 10 mols of adipic acid, 9 parts of 1,4-butandiol with 40 parts of 4,4'-diphenyl methane diisocyanate having an HCl acidity of 0.017 percent to form the corresponding polyurethane.

The polyester being modified is any fiber forming thermoplastic linear high molecular weight condensation polyester, and particularly polyethylene terephthalate as well as polymers of cyclohexanedimethylene terephthalate. These polyesters as well as copolyesters of aromatic dicarboxylic acids and particularly condensation products of ethylene glycol with a mixture of terephthalic acid and isophthalic acid, ethylene glycol with terephthalic acid and another dibasic acid such a sebisic or adipic acid or hydroxycarboxylic acid such as parahydroxy benzoic acid present in small amounts and polyesters of terephthalic acid with the glycol 1,4 bis(hydroxymethyl) cyclohexane. By linear terephthalic polyesters is meant a linear condensation polyester comprising recurring glycol dicarboxylate structural units in which at least about 85 percent of the recurring structural units are units of the formula

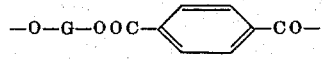

wherein G represents a divalent organic radical containing from about two to about eight carbon atoms which is attached to the adjacent oxygen atoms by saturated carbon atoms. The terephthalate radical may be the sole dicarboxylate constituent of the recurring structural units or up to about 15 percent of the structural units may contain other dicarboxylate radicals such as adipate, sebacate, isophthalate, 4,4' bibenzoate and hexahydroterephthalate. By high molecular weight is meant polyesters having an intrinsic viscosity of at least 0.6 and preferably greater than 0.8 and as high as 1.5 as measured in a 60/40 phenol/tetrachlorethane mixed solvent at 30° C. It is preferred that the polyethylene terephthalate and other similar polyesters have a high melting point which for polyethylene terephthalate is about 265° C. measured with a hot stage polarizing microscope. Generally the polyester fibers of this invention may be prepared in accordance with well known procedures for melt extrusion and drafting.

The following examples disclose how an improved polyester cord may be made by adding a polyamide and other modifiers as indicated to polyester chips and then forming filaments therefrom, which modified polyester filaments are then gathered into yarn which is then twisted into a cord.

EXAMPLES

| | Parts by Weight | | | |
|---|---|---|---|---|
| | 1(control) | 2 | 3 | 4 |
| 1. Polyethylene terephthalate (polyester chips) a. I.V. .6 | 100 | 100 | 100 | 100 |
| 2. nylon 66 (–Zytel" 101)(chips) | | 1.0 | 1.0 | 1.0 |
| 3. Copper dimethyldithiocarbamate ("Cumate") (powder) | | | .01 | .01 |
| 4. Polycarbonate ("Merlon" M–39 ) (chips) | | | 2.0 | 2.0 |
| 5. polyisocyanating agent ("Texin" 192A)(powder) | | | | 0.5 |

The dried polyester chips (1) are tumbled with the modifiers (2), (3) and (4) in the combination indicated for Examples 2, 3 and 4 until the mixture is substantially homogeneous. Each blend is then melted in a conventional extruder head and each melt is then spun at a temperature of about 290° C. through a 190 hole spinneret at a spinning speed of 150 yards per minute to give a single spun yarn having a total denier of approximately 7,800 in accordance with well-known practice used in the melt spinning art and shown in U.S. Pat. Nos. 3,091,510 and 3,097,056. The spun yarn is passed to a pair of rotating heated feed rolls and then passed around a pair of heated draw rolls rotating at a speed to impart a draw ratio of about 6 to 1 to give a total denier of approximately 1,300 and then wound on a bobbin.

The modified polyester yarn had the following properties.

| polyester (examples) | control(1) | Ex. 2 | Ex. 3 | Ex. 4 |
|---|---|---|---|---|
| 1. Tenacity (grams/denier) | 8.0 | 8.3 | 8.3 | 7.8 |
| 2. Break elongation (%) | 9.5 | 9.3 | 13.0 | 12.8 |
| 3. I.V. | .79 | .78 | 0.79 | 0.80 |

The yarn of Examples 1, 2, 3 and 4 was made into cords (1,300/3, 8/8) and treated with conventional R/F/L adhesive made in the following manner, R/F/L being resorcinol/formaldehyde/rubber latex adhesive. A 20 percent solids dispersion of the R/F/L adhesive is made by adding 8.9 parts of resorcinol to 6.55 parts of a 37 percent solution of formaldehyde and 5 parts of a 10 percent solution of sodium hydroxide which is then added to a rubber latex mixture comprising 35.5 parts of a 39.5 percent total solids of the 70/15/15 terpolymer of butadiene/styrene/vinyl pyridine and 64 parts of a 40.7 percent total solids of a 70/30 copolymer of butadiene/styrene, the mixture being in 130.05 parts of water. The cords are passed through a dip tank containing this adhesive. The dipped cords are then dried at 450° F. and embedded in rubber compounds as shown below. Peel adhesion test is made of a 1-inch strip under static conditions at 250° F. Thermal stability of the cord is measured in terms of percent tensile retained by the air bomb (AB). Air bomb testing is done by heating the untreated cord embedded in the rubber compound as shown below for 2.5 hours at 350° F. under 80 psi air pressure. The data obtained is listed in Table I.

TABLE I

| Rubber reinforced with Cord from example | Peel Adhesion[1] Strip Force Rating | Mallory Fatigue KC (2) | Percent Tensile Retained |
|---|---|---|---|
| 1. Control(no modifier added) | 100 | 100 | 100 AB |
| 2. nylon 66 +Cumate modified cord | 98 | 200 | 112 AB |
| 3. nylon 66 +Cumate + polycarbonate modified cord | 117 | 97 | 100 AB |
| 4. nylon 66 +polycarbonate + polyisocyanating agent modified cord | 105 | 201 | 97 AB |

[1]Peel adhesion is determined in the following manner. Onto the surface of a 12 mil thick sheet (12" × 12") of rubber (MRS) is laid the treated cords at the rate of 18 per inch which are then covered with a second sheet (12" × 12") of 12 mil gauge rubber (MRS). This "sandwich" arrangements of rubber cord and rubber is then doubled onto itself with a piece of Holland cloth extending one inch into the doubled assembly from the open end from which assembly is clicked 1" × 3" samples, which samples are then cured in a mold at 290° F. for 20 minutes. The cured sample is then placed in an Instron machine, heated at 250° F. and the two strips of rubber separated by the Holland cloth are then moved in opposite directions at the rate of 2" per minute to determine the average force.
[2]ASTM–D 885–59T The rubber component of the rubber structure of this invention may be any rubber that is a stretchable composition having a tendency to return to its approximate original shape after being vulcanized, and particularly any rubber that is used in the manufacture of tires and drive belts. Thus, the laminate of this invention may involve natural rubber otherwise known as *Hevea Brasiliensis*, or conjugated diene polymeric rubbers made by polymerizing butadiene-1,3, isoprene, 2,3-dimethyl butadiene-1,3, and mixtures of these conjugated dienes as well as copolymers of these diene monomers with up to 50 percent of compounds which contain a $CH_2=C=$ group and which are copolymerizable with butadiene-1,3 where, for example, at least one of the valences is attached to an electronegative radical, that is a radical which increases the polar character of the molecule such as vinyl, phenyl, nitrile and carboxy radicals. Examples of the diene rubbers are polybutadienes including the stereospecifics, polyisoprenes including the stereospecifics, butadiene/sytrene copolymers, also known as SBR, and butadiene/acrylonitrile copolymers also known as NBR.

The control and modified polyester cords of this invention are embedded in rubber compounds in accordance with the following formula:

| Ingredients | Parts by weight Amount Used | May be Used |
|---|---|---|
| 1. Natural Rubber Used | | Used |
| 1. Natural Rubber | 70 | 0–100 |
| 2. OE/SBR 1778 (styrene/butadiene-1,3 23.5/76.5 copolymer) (plus 37½ parts oil per 100 SBR | 27.5 | 100–0 |

| | | |
|---|---:|---:|
| 3. Cis 1,4-polybutadiene | 10 | 0–50 |
| 4. Carbon Black (Reinforcing agent) | 40 | 25–100 |
| 5. Zinc Oxide (Activator of Cure) | 4 | 2–10 |
| 6. Stearic Acid (Activator of cure) | 2 | 1.5–3.0 |
| 7. Primary Accelerator (2,2'-dithio-bisbenzothiazole) | 1.25 | .5–3.0 |
| 8. Pine Oil (Softener) | 10 | 2–50 |
| 9. Secondary Accelerator (tetramethyl thiuram disulfide) .10 | | .05–1.0 |
| 10. Antioxidant .60 | | .1–4 |
| 11. Sulfur (Vulcanizing agent) | 2.5 | 1.0–5.0 |

In compounding the rubber stock in accordance with the formulation set forth above, a master batch of ingredients (1) and (2) are made with the carbon black and mixed on a mill to a temperature of about 110° C. and may be mixed at a temperature as high as 140° C. The resulting carbon black master batch is then cooled and the remaining compounds are mixed into the batch in the order indicated above to a temperature of about 70° C. and may be mixed at a temperature as high as 100° C.

The rubber structure of this invention may be prepared by first coating a reinforcing fabric with the rubber and then using the rubber coated fabric to make any desired structure as, for example, a pneumatic tire. The rubber will be compounded in the manner set forth above. The reinforcing fabric may be used without any previous treatment, and under these conditions the fabric is known as grey cord indicating that no treatment in the form of an adhesive composition has been applied to the surface of the cord. Thus, the present invention may be used in the manufacture of a pneumatic tire of conventional present day design as shown, for example, in such U.S. Pat. Nos. as 3,157,218; 3,160,191, 3,160,192; 3,217,778; 3,225,810; 3,225,812; 3,244,215; 3,253,633 and 3,253,638 all of which show a vulcanized rubberized fabric carcass of generally torodial shape having a tread portion superimposed and bonded to the crown area of the carcass and plies of rubberized fabric forming sidewalls extending from the tread over the carcass to the bead portion.

While certain representative embodiments and details have been shown for the purpose of illustrating the invention, it will be apparent to those skilled in this art that various changes and modifications may be made therein without departing from the spirit or scope of the invention.

What is claimed is:

1. In a heat stable structure comprising a heat stable polyester tire cord bonded to natural or diene synthetic rubber by means of an R/F/L adhesive, the improvement wherein the cord is made of polyethylene terephthalate fibers melt spun from a melt composition resulting from melting a physical mixture comprising polyethylene terephthalate having an I.V. of at least 0.6 and not greater than 1.5, from about 0.01 part to about 5.0 parts of a polyamide having a melting point in excess of 175° C., from about 0.0001 part to about 0.1 part of copper dimethyldithiocarbamate, all parts being by weight per 100 parts of polyethylene terephthalate.

2. The structure of claim 1 wherein the polyamide is a linear condensation superpolymer of hexamethylenediamine and adipic acid.

3. The structure of claim 1 the composition also containing from about 0.5 part to about 2.5 parts of a polycarbonate having a molecular weight from about 15,000 to about 80,000.

4. The structure of claim 3 wherein the polycarbonate is the reaction product of carbonic acid and bis phenol A and has the repeating unit

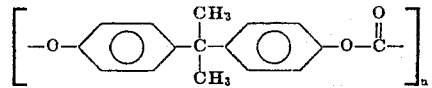

wherein $n$ has a value from about 10 to 400.

5. In a heat stable structure comprising a heat stable polyester tire cord bonded to natural or diene synthetic rubber by means of an R/F/L adhesive, the improvement wherein the cord is made of polyethylene terephthalate fibers melt spun from a melt composition resulting from melting a physical mixture comprising polyethylene terephthalate having an I.V. of at least 0.6 and not more than 1.5, from about 0.01 part to about 5.0 parts of a polyamide having a melting point in excess of 175° C., from about 0.5 part to about 2.5 parts of a polycarbonate having the repeating unit

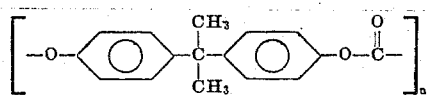

wherein $n$ has a value from about 10 to 400 and from about 0.01 part to about 2.0 parts of an organic polyisocyanating agent, all parts being by weight per 100 parts of polyethylene terephthalate.

6. The structure of claim 5 wherein the polyisocyanating agent in the composition is a blocked isocyanate.

7. The structure of claim 6 wherein the isocyanate is blocked with a blocking agent selected from the group consisting of primary and secondary alcohols, monohydric and polyhydric phenols, amines, amides, lactams, and resinous reaction products of an aldehyde and a component selected from the group consisting of urea, phenol, and resorcinol.

8. The structure of claim 7 wherein a polycarbonate derived from a 4,4'4,4'-dihydroxy di(mononucleararyl)-alkane is present in the mixture in an amount up to about 2 parts per 100 parts of polyester.

* * * * *